United States Patent
DeForest

(10) Patent No.: US 9,031,336 B2
(45) Date of Patent: May 12, 2015

(54) SYSTEMS AND METHODS FOR HYBRID COMPRESSION OF SPECTRAL IMAGE DATA

(71) Applicant: Southwest Research Institute, San Antonio, TX (US)

(72) Inventor: Craig F. DeForest, Nederland, CO (US)

(73) Assignee: Southwest Research Institute, San Antonio, TX (US)

( * ) Notice: Subject to any disclaimer, the term of this patent is extended or adjusted under 35 U.S.C. 154(b) by 82 days.

(21) Appl. No.: 13/860,148

(22) Filed: Apr. 10, 2013

(65) Prior Publication Data

US 2014/0307975 A1 Oct. 16, 2014

(51) Int. Cl.
*G06K 9/36* (2006.01)
*G06K 9/46* (2006.01)
*G06T 9/00* (2006.01)

(52) U.S. Cl.
CPC .................................... *G06T 9/00* (2013.01)

(58) Field of Classification Search
None
See application file for complete search history.

(56) References Cited

U.S. PATENT DOCUMENTS

| | | | |
|---|---|---|---|
| 5,647,024 A | 7/1997 | Kawauchi et al. | |
| 6,061,475 A * | 5/2000 | Blair | 382/239 |
| 6,535,647 B1 * | 3/2003 | Abousleman | 382/253 |
| 6,539,122 B1 * | 3/2003 | Abousleman | 382/240 |
| 6,724,940 B1 * | 4/2004 | Qian et al. | 382/253 |
| 6,813,485 B2 * | 11/2004 | Sorrells et al. | 455/313 |
| 7,224,845 B1 * | 5/2007 | Russo et al. | 382/240 |
| 7,248,358 B2 * | 7/2007 | Geshwind et al. | 356/310 |
| 7,777,914 B2 * | 8/2010 | Seko et al. | 358/1.9 |
| 7,907,784 B2 * | 3/2011 | Gladkova et al. | 382/232 |
| 7,984,174 B2 * | 7/2011 | Rideout | 709/231 |
| 8,384,896 B2 | 2/2013 | Meade et al. | |
| 8,432,974 B2 * | 4/2013 | Chen | 375/240.19 |
| 2006/0078211 A1 * | 4/2006 | Tjandrasuwita et al. | 382/239 |
| 2011/0007819 A1 * | 1/2011 | Chen | 375/240.19 |
| 2011/0110600 A1 | 5/2011 | Niemi et al. | |

OTHER PUBLICATIONS

Epstein et al., "Multispectral KLT-wavelet data compression for Landsat thermatic mapper images," Proc. Data Compression Conf., Apr. 1992, pp. 200-208.*

J.S. Walker "Wavelet-based Image Compression" (41 pgs), Subchapter of CRC Press Book 2000: The Transform and Data Compression Handbook; Edited by K . R . Rao and P . C . Yip; Print ISBN: 978-0-8493-3692-8; book and contents info downloaded http://www.crcpress.com/product/isbn/9780849336928.

* cited by examiner

*Primary Examiner* — Bhavesh Mehta
*Assistant Examiner* — Feng Niu
(74) *Attorney, Agent, or Firm* — Grossman, Tucker et al.

(57) ABSTRACT

A method and system for generating a compressed spectral image is provided. Spectral image data including a plurality of spectral intensity values is received. The spectral intensity values are associated with a first spatial dimension (x-dimension), a second spatial dimension (y-dimension) and a wavelength dimension (λ-dimension). A window is applied to the spectral image data along the λ-dimension, to select a subset of the spectral image data corresponding to a range of wavelengths. A Fourier transform is performed on the windowed spectral image data along the λ-dimension, at locations along the x-dimension and y-dimension, to generate Fourier coefficients associated with each of the locations. The Fourier transformed data is filtered by retaining a subset of the Fourier coefficients at each of the locations. Wavelet compression is performed on the filtered data along the x-dimension and the y-dimension to generate the compressed spectral image.

30 Claims, 9 Drawing Sheets

800

---

Receive spectral image data, including spectral intensity values associated with a first spatial dimension (x-dimension), a second spatial dimension (y-dimension) and a wavelength dimension (λ-dimension).
810

---

Apply a window to the spectral image data along the λ-dimension. The window is configured to select a subset of the spectral image data corresponding to a range of wavelengths
820

---

Perform a Fourier transform on the windowed spectral image data along the λ-dimension. The Fourier transform is performed at locations along the x-dimension and the y-dimension, generating Fourier coefficients associated with each of the locations.
830

---

Filter the Fourier transformed data to retain a subset of the Fourier coefficients at each of the locations.
840

---

Perform wavelet compression on the filtered data along the x-dimension and along the y-dimension to generate the compressed spectral image.
850

FIG. 8

SYSTEMS AND METHODS FOR HYBRID COMPRESSION OF SPECTRAL IMAGE DATA

FIELD OF INVENTION

The present disclosure relates to image data compression, and in particular to image data compression for spectral images using hybrid compression techniques including both Fourier decomposition and wavelet decomposition.

BACKGROUND

An imaging spectrometer may be used to obtain spectral images of objects or scenes that emit electromagnetic energy. The spectral image generally shows the radiance of the emissions at various wavelengths for each point in a two dimensional image plane of the object. The spectral images may provide, among other things, information about the chemical composition, motion and temperature of the object being imaged. Spectral imaging is often performed on spacecraft that are deployed to observe astronomical features. For example, spectral imaging may be used for solar observations.

Because spectral images have 3 dimensions, 2 spatial dimensions associated with the image plane and an additional dimension associated with the wavelength, these images may be relatively large and the transmission of these images from a spacecraft to an earth-based receiver may exceed the bandwidth capacity of the communication link. Some form of image compression may therefore be required. Unfortunately, existing compression schemes that can provide the degree of compression required generally introduce artifacts and degrade the image to an extent that may adversely affect analysis of the data. What is needed, therefore, are improved methods and systems for spectral image data compression.

SUMMARY

The present disclosure describes methods and systems for hybrid compression of spectral image data utilizing Fourier decomposition in the spectral or wavelength dimension and wavelet decomposition in the spatial dimensions. Image compression may be achieved, along the spectral dimension, by filtering out the higher frequency Fourier coefficients and bit quantizing the remaining lower frequency coefficients to varying degrees based on the associated frequency of the coefficient. Image compression may be achieved, along the spatial dimensions, by wavelet compression of the x and y dimensions of each plane of the filtered Fourier coefficients.

In some embodiments, a method is provided for generating a compressed spectral image. The method may include receiving spectral image data, the spectral image data comprising spectral intensity values, each of the spectral intensity values associated with a first spatial dimension (x-dimension), a second spatial dimension (y-dimension) and a wavelength dimension ($\lambda$-dimension). The method may also include applying a window to the spectral image data along the $\lambda$-dimension, the window configured to select a subset of the spectral image data corresponding to a range of wavelengths. The method may further include performing a Fourier transform on the windowed spectral image data along the $\lambda$-dimension, the Fourier transform performed at locations along the x-dimension and the y-dimension Fourier coefficients associated with each of the locations. The method may further include filtering the Fourier transformed data to retain a subset of the Fourier coefficients at each of the locations. The method may further include performing wavelet compression of the filtered data along the x-dimension and along the y-dimension to generate the compressed spectral image. The method may further include varying the compression parameters between planes of the Fourier coefficients, based on the amount of information content in each of those planes.

In some embodiments, a system is provided for generating a compressed spectral image. The system may include an image compression module configured to receive spectral image data, the spectral image data comprising spectral intensity values, each of the spectral intensity values associated with a first spatial dimension (x-dimension), a second spatial dimension (y-dimension) and a wavelength dimension ($\lambda$-dimension). The system may also include a windowing module configured to apply a window to the spectral image data along the $\lambda$-dimension, the window configured to select a subset of the spectral image data corresponding to a range of wavelengths. The system may further include a Fourier transform module configured to perform a Fourier transform on the windowed spectral image data along the $\lambda$-dimension, the Fourier transform performed at locations along the x-dimension and the y-dimension to generate Fourier coefficients associated with each of the locations. The system may further include a filter module configured to filter the Fourier transformed data, the filtering comprising retaining a subset of the Fourier coefficients at each of the locations. The system may further include a wavelet compression module configured to perform wavelet compression of the filtered data along the x-dimension and along the y-dimension to generate the compressed spectral image.

BRIEF DESCRIPTION OF DRAWINGS

The above-mentioned and other features of this disclosure, and the manner of attaining them, will become more apparent and better understood by reference to the following description of embodiments described herein taken in conjunction with the accompanying drawings, wherein:

FIG. 8 illustrates a flowchart of operations of another exemplary embodiment consistent with the present disclosure.

DETAILED DESCRIPTION OF PREFERRED EMBODIMENTS

Figure 1:
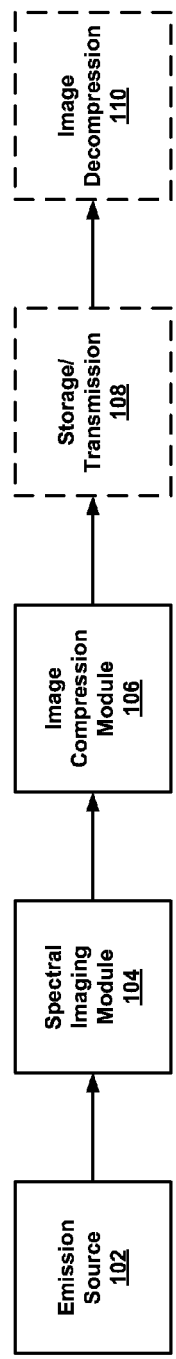
FIG. 1 illustrates a top level system block diagram of one exemplary embodiment consistent with the present disclosure.

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

The present disclosure relates to compression of spectral image data utilizing a hybrid combination of Fourier decomposition in the spectral (wavelength) dimension and wavelet decomposition in the spatial dimensions. Image compression may be achieved, along the spectral dimension at each spatial location, by filtering out the higher frequency Fourier coefficients generated by the Fourier transform and bit quantizing the remaining lower frequency coefficients. The degree of quantization may be based on the associated frequency of the coefficients with higher frequency components subject to greater quantization. Image compression may be achieved, along the spatial dimensions, by wavelet compression of the x and y dimensions of each plane of the filtered Fourier coefficients, as will be explained in greater detail below. The compression parameters may vary so that higher frequency coefficient planes are compressed more than lower frequency coefficient planes.

Referring now to FIG. 1, there is shown a top level system block diagram 100 of one exemplary embodiment consistent with the present disclosure. A spectral imaging module 104 may be configured to generate a spectral image based on electromagnetic radiation received from an emission source 102, such as an astronomical object, for example the sun. The spectral image may be a three dimensional (3-D) image that provides spectral intensity values for each of a number of wavelengths ($\lambda$ values) at each of a number of positions (x, y locations) within a two dimensional (2-D) image plane. Image compression module 106 may be configured to compress the spectral image, using hybrid compression techniques, as will be discussed below.

In some embodiments, the compressed spectral image may then be stored or transmitted by optional storage/transmission module 108, where the image compression provides for reduced memory requirements and/or lower communication bandwidth. This may be particularly advantageous in spacecraft applications where hardware resources can be especially limited due to stringent size, weight and reliability requirements, and where communication (telemetry) link bandwidths can be constrained. Optional image decompression module 110 may be configured to decompress the previously compressed spectral image to a form that is suitable for viewing and/or analysis. Image decompression module 110 may be part of an earth-based receiver (or subsequently employed analysis) system configured to receive compressed spectral images from a spacecraft-based spectral imager.

Figure 2:
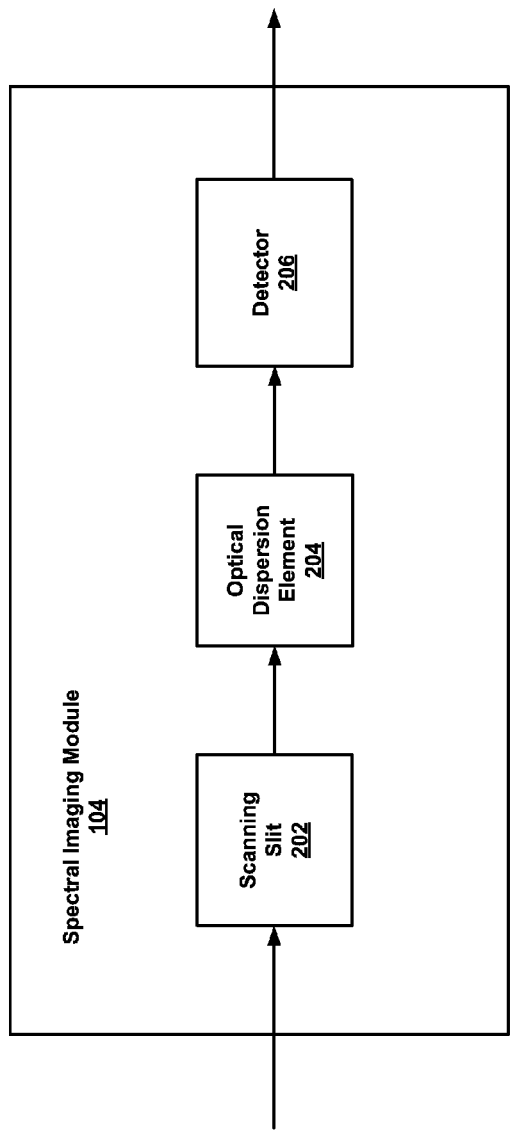
FIG. 2 illustrates a block diagram of a component of one exemplary embodiment consistent with the present disclosure.

FIG. 2 illustrates a block diagram 200 of a component of one exemplary embodiment consistent with the present disclosure. Spectral imaging module 104 is shown to include a scanning slit 202, an optical dispersion element 204 and a detector 206. Scanning slit 202 may be configured to limit the radiation received from emission source 102 to a single spatial dimension. For purposes of discussion in the present disclosure, this spatial dimension may be considered to lie in the vertical direction or y-axis (for example, relative to the other components of the spectral imaging module 104, such as the detector 206), although in practice the scanning slit may be oriented in any direction. Under this convention, then, the scanning slit 202 may be considered to capture a vertical slice of the complete (x,y) image plane. In operation, the scanning slit 202 moves along the horizontal direction or x-axis (perpendicular to the scanning slit dimension) as it scans so that at any given point during the scan, the vertical slice associated with that position on the x-axis is provided to the optical dispersion element 204.

Optical dispersion element 204 may be configured to spectrally disperse the beam into a spectral range of wavelengths ($\lambda$) for each of multiple locations along the y-axis. The optical dispersion element 204 may be a prism, a diffraction grating or any other suitable mechanism for generating a spectrum. The term "optical" is not intended to limit applicability of the present disclosure to a particular range of wavelengths or frequencies of the received radiation, and may in fact comprise any portion of the electromagnetic spectrum that is of analytical interest. Nor is it intended to be limited to electromagnetic spectra as embodiments of the present disclosure may be used for any analogous physical system that generates spectral-like data, for example mass spectrometry.

The spectral intensity at each wavelength and at each y-axis position is captured as a spectral intensity value (sometimes simply referred to as a pixel value) by detector 206. The detector 206 may be configured to provide any suitable image resolution which may be designated, for example, as N pixels in the x (spatial) dimension, M pixels in the y (spatial) dimension and K pixels in the $\lambda$ (wavelength) dimension. The detector 206 may further be configured to digitize each pixel to a spectral intensity value of B bits. This process may be repeated at each x-axis position, as the scanning slit scans along the x-axis dimension, to generate a 3-D data cube as shown in FIG. 3, to be discussed more fully below.

Figure 3:
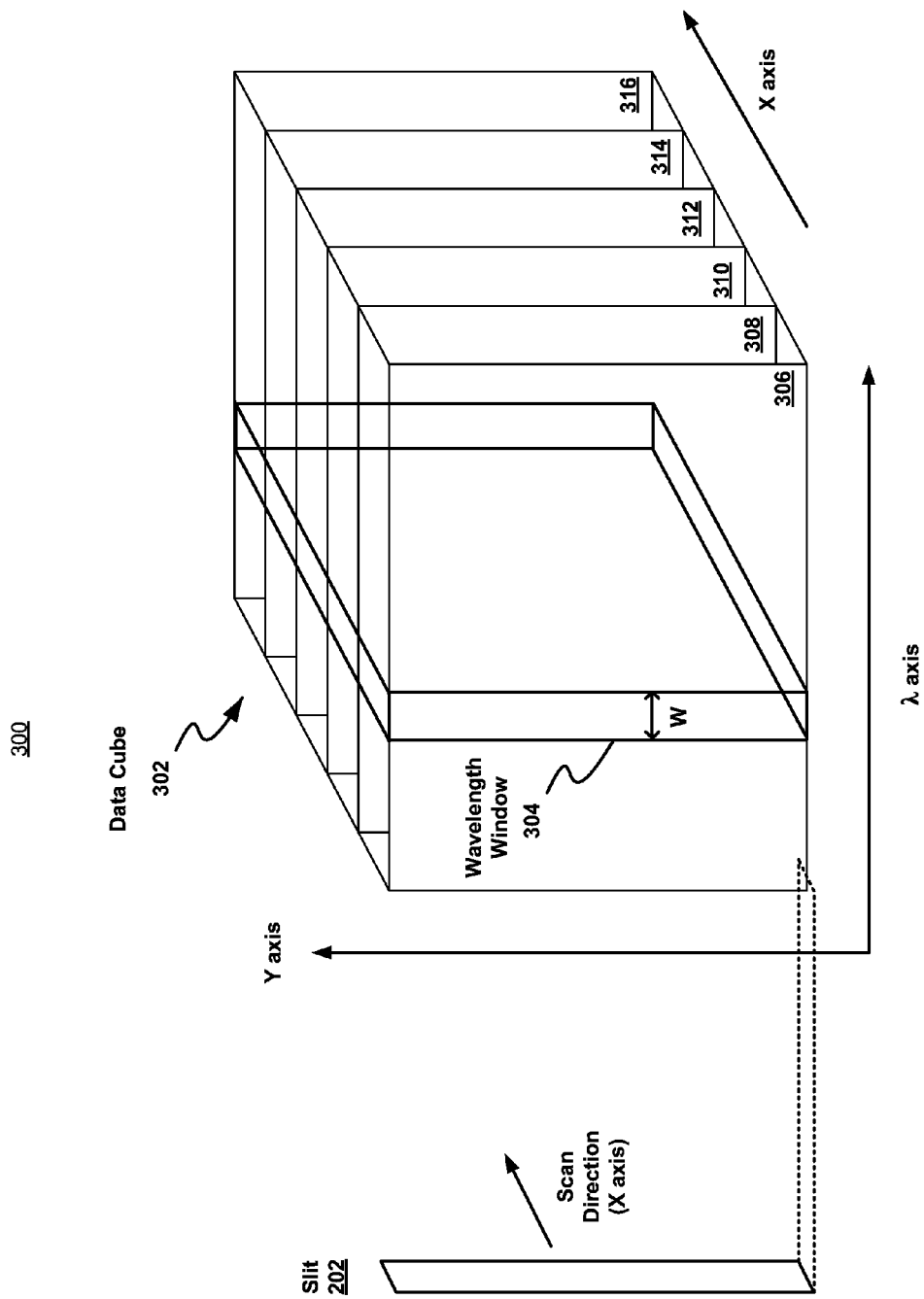
FIG. 3 illustrates a spectral image data cube in accordance with an exemplary embodiment of the present disclosure.

FIG. 3 illustrates the configuration 300 of a spectral image data cube in accordance with an exemplary embodiment of the present disclosure. As scanning slit 202, oriented parallel to the y-axis, moves or scans along the x-axis, the detector creates a 2-D spectral image at a number of positions along the x-axis 306, 308, . . . 316. Each of these 2-D spectral images comprise spectral intensity values (or pixels) corresponding to a wavelength and a position on the y-axis. The 2-D spectral images may be grouped into a 3-D data cube 302 having two spatial dimensions (the x-axis and the y-axis) and a third wavelength dimension (the $\lambda$-axis). Each data point within the data cube 302 provides a spectral intensity value associated with an x and y spatial coordinate and associated with an index along the $\lambda$-axis that indicates a particular wavelength from the range of wavelengths provided by the dispersion element 204.

The data cube may be visualized along any two of the three dimensions. For example, a 2-D planar slice of the cube may be obtained for any selected wavelength. Such a slice would show a spectral intensity image (for that wavelength) as a function of x and y position. This may be called a wavelength slice (or plane) of the data cube.

During compression processing, as will be explained below, it will be convenient to window the spectral image data over one or more selected subsets of the available range of wavelengths. One wavelength window 304 is shown in FIG. 3 having a width W of wavelength indices along the $\lambda$-axis. The wavelength window 304 may be viewed as a slab or cross section of the data cube 302 comprising a number of the aforementioned 2-D wavelength slices stacked together.

Although only one window is shown for simplicity in this illustration, multiple windows covering different ranges of wavelengths may be used during the compression process.

Figure 4:
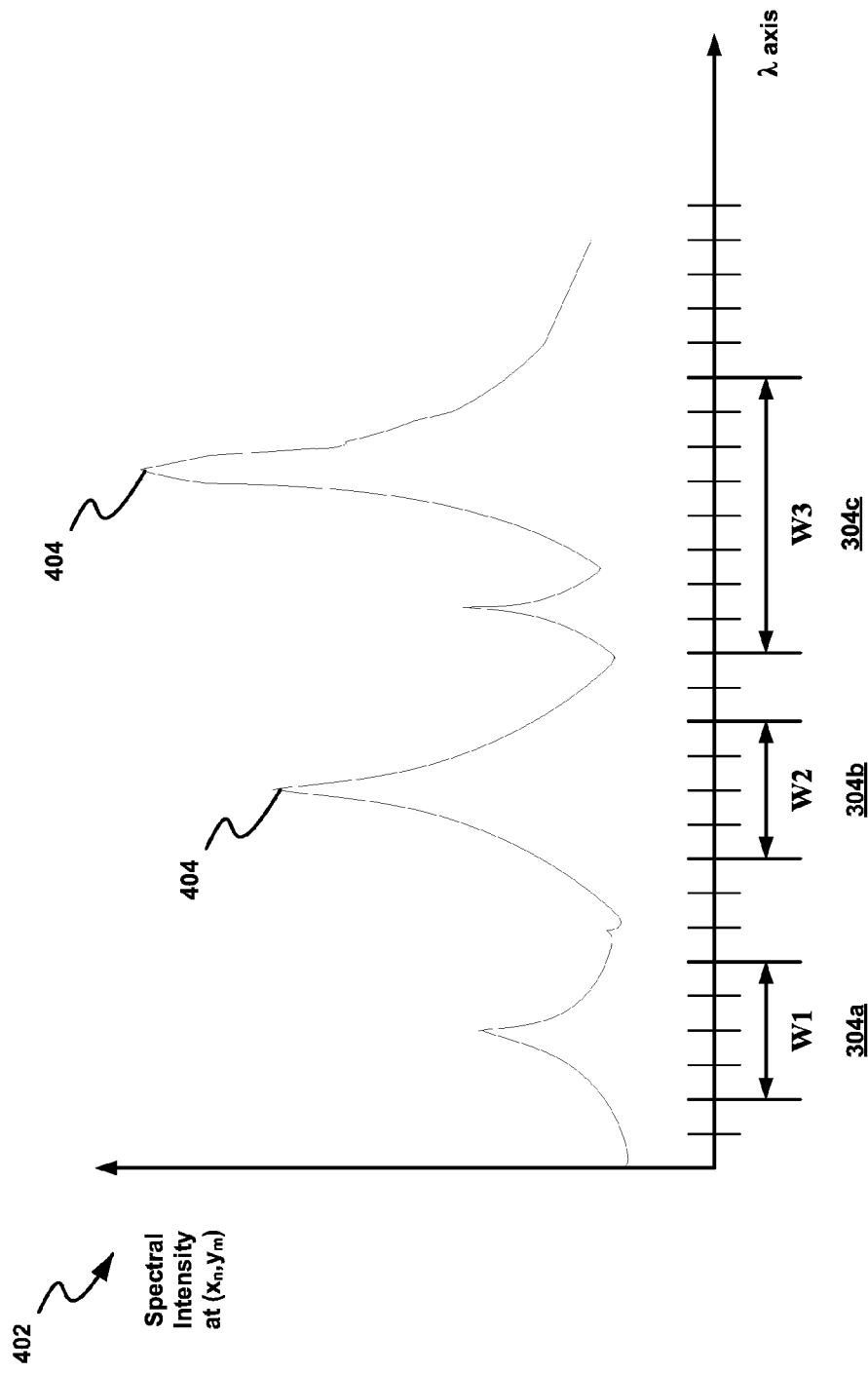
FIG. 4 illustrates spectral intensity windows in accordance with an exemplary embodiment of the present disclosure.

Referring now to FIG. 4, multiple spectral intensity windows are illustrated in accordance with an exemplary embodiment of the present disclosure. An example spectral intensity plot 402 is shown as a function of wavelength along the λ-axis. A plot of this type may be obtained from the data cube 302 for each spatial location ($x_n$, $y_m$). The amplitude of peaks in the plot 404 (also called spectral lines) may be indicative of the chemical composition of the radiating emission source 102 to be analyzed, and the shape and central wavelength of each peak may include information related to the motion, temperature and other physical properties of the radiating emission source 102. Three windows are shown: $W_1$ 304a, $W_2$ 304b, and $W_3$ 304c, each of which selects a subset of the wavelength range. Each window, when applied over all spatial locations (x,y) defines a slab of stacked planes in the data cube 302 as described previously. Although three windows are shown for illustration, in practice any number of windows may be employed. The windows may be of any suitable length and placed at any suitable location (typically centered on a single spectral line or pair of spectral lines) and may provide for a sparse selection of the total wavelength range.

Figure 5:
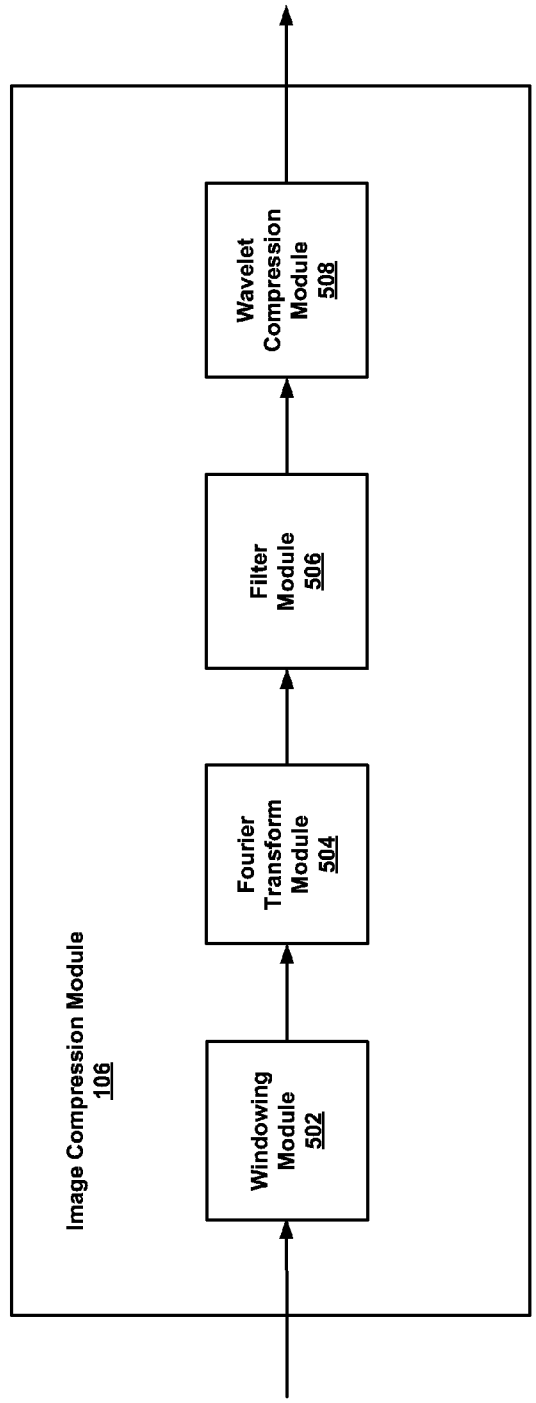
FIG. 5 illustrates a block diagram of another component of one exemplary embodiment consistent with the present disclosure.

FIG. 5 illustrates a block diagram 500 of another component of one exemplary embodiment consistent with the present disclosure. Image compression module 106 is shown to include windowing module 502, Fourier transform module 504, filter module 506 and wavelet compression module 508. Spectral image data, for example in the form of data cube 302, is received by image compression module 106. Windowing module 502 may be configured to window the spectral image data along the wavelength dimension to select one or more subsets of the spectral image data corresponding to a range of wavelengths.

Figure 6:
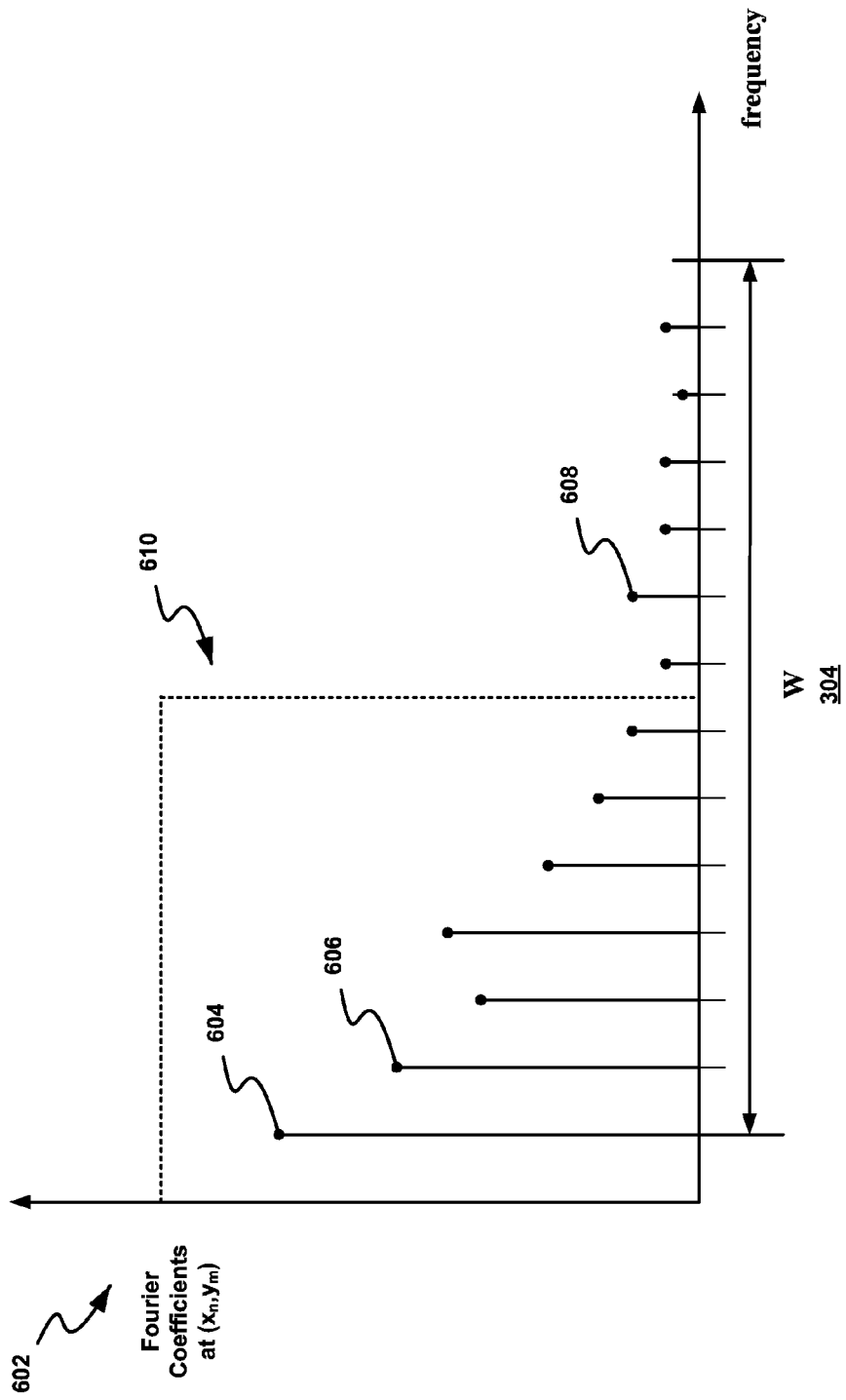
FIG. 6 illustrates Fourier coefficients in accordance with an exemplary embodiment of the present disclosure.

Fourier transform module 504 may be configured to transform each windowed wavelength segment 304 of the spectral intensity 402 into the Fourier domain. This operation converts the spectral intensity 402, which is a function of wavelength, into Fourier coefficients 602 as shown in FIG. 6. Each Fourier coefficient 604, 606 ... 608, represents a frequency component of the spectral intensity waveform over the windowed wavelength 304. The Fourier coefficients 602 may be complex numbers comprising magnitude and phase.

It will be appreciated that the Fourier transform may be performed using a Fast Fourier Transform (FFT) algorithm, or through any other suitable technique. In some embodiments, the window length may be a power of 2 (e.g., 8, 16, 32 or 64) for improved transform efficiency.

The Fourier coefficients 602 provide an alternative representation, in the frequency domain, of the spectral intensity over the windowed wavelength. This alternative frequency domain representation will be useful for the data compression to be described below.

An example incorporating sample numerical values is provided for illustration purposes. Data cube 302 may have an x-axis length of 500, a y-axis length of 1000 and a λ-axis length of 128. For each of the 500,000 x,y spatial positions, the dispersion element may generate spectral intensity values corresponding to each of 128 wavelengths along the wavelength dimension. Four windows of length 32 may be applied along the wavelength dimension, which may be sampled completely or only sparsely by those windows. In this example then, each window comprises a spectral intensity waveform of length 32 which captures the spectral intensity, as a function of wavelength, at that x,y position over the wavelength range associated with that 32 length window. Fourier transform module 504 may generate 16 unique complex Fourier coefficients to represent that spectral intensity waveform in the frequency domain, due to the symmetry properties of the Fourier transform and the fact that the original data (the spectral intensity) is real-valued. Typically, the Fourier transform preserves the number of input values, organizing them into complex coefficients so that there are half as many complex coefficients as wavelengths in the window, or exactly as many unique values as wavelengths in the window. Each unique Fourier value may thus be referred to as being associated with a bin or cell, for example bins 0 through 31 in this case.

In some embodiments, the x-axis dimension may be in a range of 400 to 600 pixels (or samples), the y-axis dimension may be in a range of 600 to 1000 pixels (or samples), and the window length associated with the wavelength dimension may be in the range of 16 to 128 pixels (or samples).

It will be appreciated that 2-D planes (or slices) of the data cube may be selected from a collection of Fourier coefficients in a given bin over a range of spatial dimensions x and y to form Fourier coefficient planes. Or, in other words, the Fourier coefficient planes may be stacked to form the data cube.

The lower frequency Fourier coefficients (i.e., the lower numbered bins 0, 1, 2 . . . ) typically contain the more useful spectral information. For example, the overall spectral intensity may be encoded in the zero-frequency Fourier coefficient magnitude, the Doppler shift may be encoded redundantly in the phases of the first few nonzero Fourier coefficients and the spectral line width may be encoded in the magnitudes of the first few Fourier coefficients. This characteristic may be used to advantage for data compression purposes by allowing the higher frequencies to be discarded, which preserves the shape of the spectral line while ignoring smaller features that are generally attributed to noise. Filter module 506 may be configured to perform low pass filtering on the Fourier transformed spectral dimension by, for example, retaining the lower frequency coefficients and discarding the higher frequency coefficients. Low pass filtering is illustrated by dashed line 610 in FIG. 6 to indicate that the 7 lowest frequency Fourier coefficients are retained in that example. In some embodiments the low pass filtering may retain the lowest 33% of frequency Fourier coefficient bins. In some embodiments the low pass filtering may retain the lowest 15% of frequency Fourier coefficient bins.

In some embodiments, additional compression may be achieved by reducing (or quantizing) the number of bits used to represent the higher frequency retained coefficients. Quantization may include truncation or rounding operations to reduce bit length.

Fourier transforming the spectral dimension, as described above, generally provides two advantages. First, it spreads losses induced by the wavelet compression operation, to be described below, across the entire spectrum, thereby reducing small discontinuities that would otherwise be introduced. Second, it allows the encoding of only the portions of the spectral data that include the more useful information. Typically, spectra appear smooth, which is an indication that their higher frequency spectral content is relatively weak compared to their lower frequency spectral content. Generally, if the spectral dimension has a width of L pixels and the applied window has a width of W pixels, then W/L Fourier coefficients may satisfactorily represent the spectral line (e.g., be used to later reconstruct the spectral line during decompression with sufficient fidelity for subsequent analysis).

Figure 7:
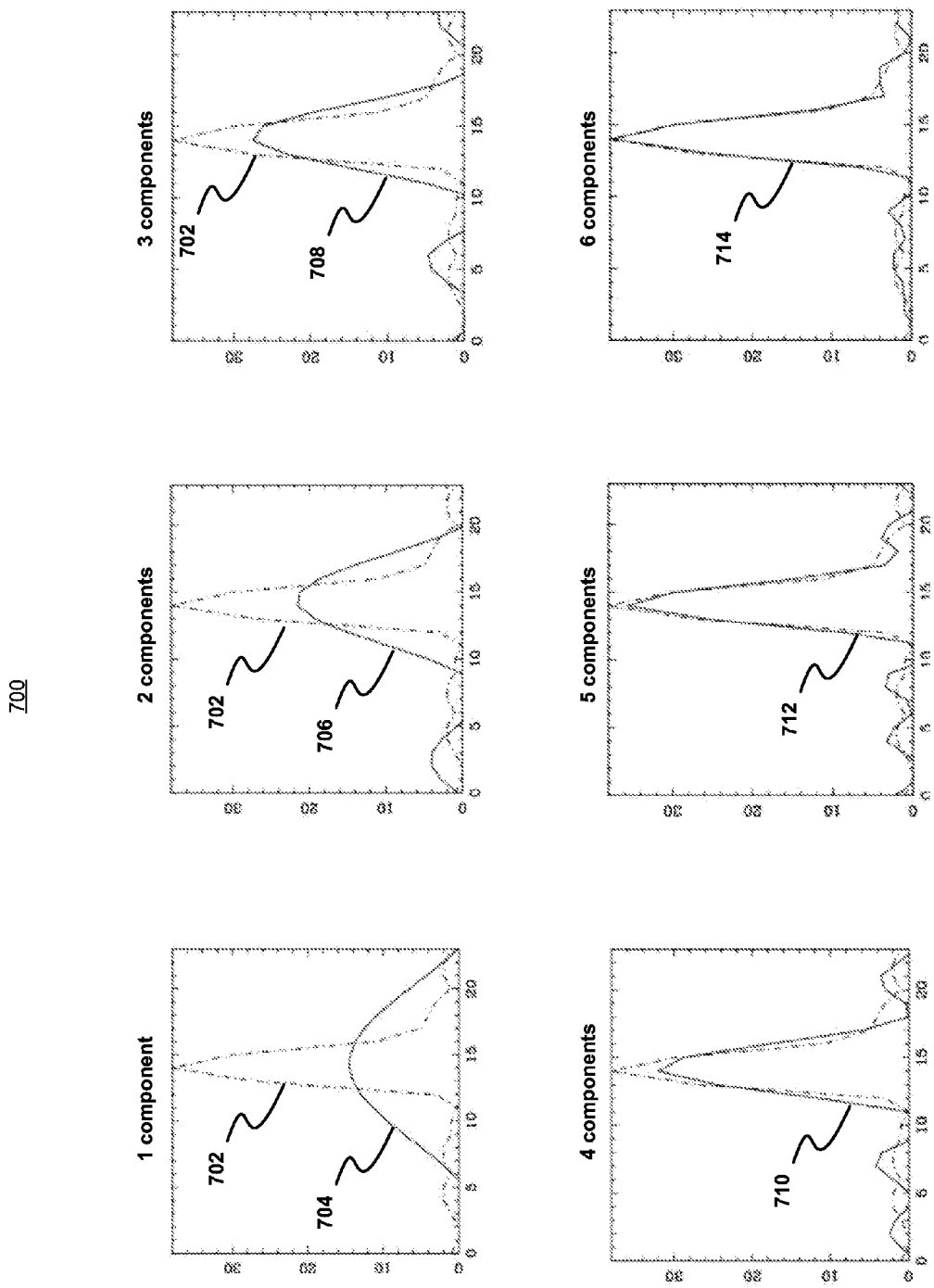
FIG. 7 illustrates spectral reconstruction in accordance with an exemplary embodiment of the present disclosure.

In an exemplary embodiment, the window may be 32 pixels wide and spectral line widths may be on the order of 3 to 5 pixels wide, depending on the width of the scanning slit. In this case, only 6 to 10 complex Fourier coefficients may be required to reconstruct the spectrum in the absence of noise. FIG. 7 illustrates example spectral reconstructions as a function of the number of retained Fourier coefficients. For example, spectral reconstruction 704 uses only one Fourier coefficient to approximate the spectrum 702. Spectral reconstructions 706 through 714 provide increasingly improved approximations of the spectrum 702 as the number of retained Fourier coefficients increases from 2 to 6 respectively. In some embodiments, a quality parameter may be generated for each spectrum. The quality parameter may be the ratio of retained to discarded Fourier coefficients, which may provide a measure of how well the spectrum was described by the Fourier coefficients.

While the Fourier coefficients are complex numbers, which may be represented as magnitude and phase components or real and imaginary components, it will be appreciated that the 0 bin is always a real number and therefore only the real component or magnitude need be stored and/or transmitted for that bin.

In some embodiments, the degree of low pass filtering and bit quantization of the Fourier coefficients may be independently adjusted for each Fourier coefficient plane.

Wavelet compression module 508 may be configured to provide further compression by applying a wavelet transformation to the Fourier coefficient planes. The wavelet transformation generates a representation of the data as a summation of wavelets of multiple shapes, the shapes defined by a set of wavelet coefficients for each wavelet. This is analogous to the manner in which a Fourier transform represents data as a summation of multiple sinusoidal waveforms, the waveforms defined by a set of coefficients encoding amplitude, frequency and phase. Wavelet compression advantageously exploits any regularities that may exist in the spatial structure of the Fourier coefficient planes (e.g., spatial smoothness over the x- and y-axis dimensions). This enables a subset of the wavelet coefficients, generated by the wavelet transform, to be discarded if they have lower information content. It also allows the wavelet coefficients to be quantized, achieving further compression by discarding low-order bits of each wavelet coefficient. In other words, the wavelet coefficients may be filtered to retain coefficients with higher information content, or to reduce the precision of representation of coefficients with lower information content without fully discarding those coefficients. The information content may be related to a measurement of energy in the wavelet divided by the number of bits used to encode the wavelet.

In some embodiments the wavelet compression algorithm may be the JPEG2000 (ISO standard 15444-1) algorithm. The Consultative Committee for Space Data Systems (CCSDS) recommended variant of this algorithm may be used due to the availability of an Application Specific Integrated Circuit (ASIC) chip set implementation. This version of the JPEG2000 algorithm implementation combines a biorthogonal 2-D discrete wavelength transform with a bit-plane encoder which can be operated in either a lossy or a lossless mode.

In some embodiments, operational parameters associated with the wavelet compression, such as output bits per pixel, may be independently adjusted for each Fourier coefficient spatial plane upon which they operate. Thus, for example, higher compression ratios (fewer bits per pixel) may be employed on the higher frequency spatial planes, to follow the reduced information content of those planes.

The total compression ratio that may be achieved by this system, therefore, is a product of the compression resulting from filtering and bit quantization of the Fourier Coefficients (which arises from spectral smoothness) and the compression resulting from filtering of the wavelet coefficients (which arises from spatial smoothness). The compressed data may be stored for later use and/or transmitted to a receiver at another location. The data may be recovered by decompressing the wavelet compressed Fourier planes and then performing an inverse Fourier transform to reconstruct each spectrum.

FIG. 8 illustrates a flowchart of operations 800 of another exemplary embodiment consistent with the present disclosure. At operation 810, spectral image data is received. The spectral image data includes spectral intensity values wherein each of the spectral intensity values is associated with a first spatial dimension (x-dimension), dimension), a second spatial dimension (y-dimension) and a wavelength dimension ($\lambda$-dimension). At operation 820, a window is applied to the spectral image data along the $\lambda$-dimension. The window is configured to select a subset of the spectral image data corresponding to a range of wavelengths. At operation 830, a Fourier transform is performed on the windowed spectral image data along the $\lambda$-dimension. The Fourier transform is performed at locations along the x-dimension and the y-dimension, generating Fourier coefficients associated with each of the locations. At operation 840, the Fourier transformed data is filtered to retain a subset of the Fourier coefficients at each of the locations. At operation 850, wavelet compression is performed on the filtered data along the x-dimension and along the y-dimension to generate the compressed spectral image.

In view of the foregoing, it may be appreciated that the present disclosure also relates to an article comprising a non-transitory storage medium having stored thereon instructions that when executed by a machine result in the performance of the steps of the methods as described in the examples above such as, for example, in connection with the description associated with FIG. 8. In some embodiments, the method operations may be implemented in software and executed by a processor or may be implemented in hardware such as, for example, an application specific integrated circuit (ASIC) or field programmable gate array (FPGA).

Figure 9:
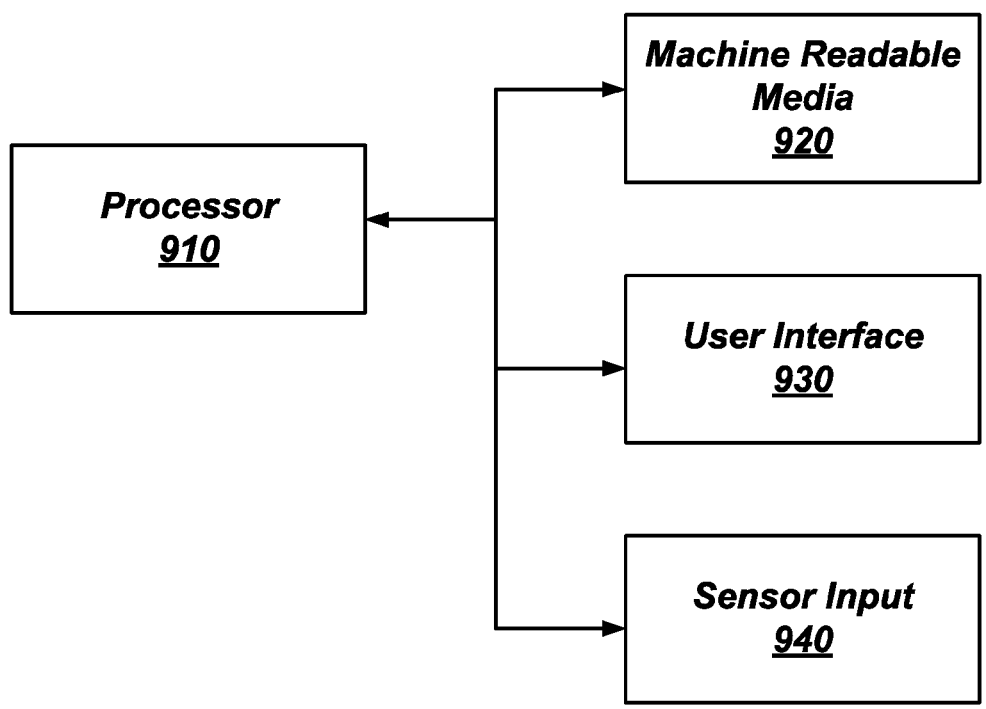
FIG. 9 illustrates a processor, machine readable media, user interface and sensor input that may be employed in an exemplary embodiment consistent with the present disclosure.

It should also be appreciated that the functionality described herein for the embodiments of the present invention may therefore be implemented by using hardware, software, or a combination of hardware and software, as desired. If implemented by software, a processor and a machine readable medium are required. The processor may be any type of processor capable of providing the speed and functionality required by the embodiments of the invention. Machine-readable memory includes any non-transitory media capable of storing instructions adapted to be executed by a processor. Non-transitory media include all computer-readable media with the exception of a transitory, propagating signal. Some examples of such memory include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g., floppy disk and hard drive), optical disk (e.g. CD-ROM), and any other device that can store digital information. The instructions may be stored on a medium in either a compressed and/or encrypted format. Accordingly, in the broad context of the present invention, and with attention to FIG. 9, the system and method for the herein disclosed hybrid spectral image compression may be accomplished with a processor (910), machine readable media (920), user interface (930) and sensor input (940).

Thus the present disclosure provides methods and systems for generating a compressed spectral image. According to one aspect there is provided a method. The method may include receiving spectral image data, the spectral image data comprising spectral intensity values, each of the spectral intensity values associated with a first spatial dimension (x-dimension), a second spatial dimension (y-dimension) and a wavelength dimension (λ-dimension). The method may also include applying a window to the spectral image data along the λ-dimension, the window configured to select a subset of the spectral image data corresponding to a range of wavelengths. The method may further include performing a Fourier transform on the windowed spectral image data along the λ-dimension, the Fourier transform performed at locations along the x-dimension and the y-dimension Fourier coefficients associated with each of the locations. The method may further include filtering the Fourier transformed data to retain a subset of the Fourier coefficients at each of the locations. The method may further include performing wavelet compression of the filtered data along the x-dimension and along the y-dimension to generate the compressed spectral image.

According to another aspect there is provided a system. The system may include an image compression module configured to receive spectral image data, the spectral image data comprising spectral intensity values, each of the spectral intensity values associated with a first spatial dimension (x-dimension), a second spatial dimension (y-dimension) and a wavelength dimension (λ-dimension). The system may also include a windowing module configured to apply a window to the spectral image data along the λ-dimension, the window configured to select a subset of the spectral image data corresponding to a range of wavelengths. The system may further include a Fourier transform module configured to perform a Fourier transform on the windowed spectral image data along the λ-dimension, the Fourier transform performed at locations along the x-dimension and the y-dimension to generate Fourier coefficients associated with each of the locations. The system may further include a filter module configured to filter the Fourier transformed data, the filtering comprising retaining a subset of the Fourier coefficients at each of the locations. The system may further include a wavelet compression module configured to perform wavelet compression of the filtered data along the x-dimension and along the y-dimension to generate the compressed spectral image.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A method for generating a compressed spectral image, said method comprising:
   receiving spectral image data, said spectral image data comprising a plurality of spectral intensity values, each of said spectral intensity values associated with a first spatial dimension (x-dimension), a second spatial dimension (y-dimension) and a wavelength dimension (λ-dimension);
   applying a window to said spectral image data along said λ-dimension, said window configured to select a subset of said spectral image data corresponding to a range of wavelengths;
   performing a Fourier transform on said windowed spectral image data along said λ-dimension, said Fourier transform performed at a plurality of locations along said x-dimension and said y-dimension, said Fourier transform configured to generate a plurality of Fourier coefficients associated with each of said locations;
   filtering said Fourier transformed data to retain: a zero-frequency Fourier coefficient magnitude to encode spectral intensity at each of said locations, a low frequency subset of Fourier coefficient phases to encode Doppler shift at each of said locations, and a low frequency subset of Fourier coefficient magnitudes to encode spectral line widths at each of said locations; and
   performing wavelet compression of said filtered data along said x-dimension and along said y-dimension to generate said compressed spectral image.

2. The method of claim 1, wherein a compression ratio is selected for said wavelet compression, said compression ratio associated with said Fourier coefficient.

3. The method of claim 1, wherein said Fourier coefficients are associated with a frequency range and said retained subset of Fourier coefficients comprise Fourier coefficients associated with lower frequencies of said frequency range.

4. The method of claim 3, wherein said lower frequencies comprise a lowest 15% of said frequency range of said Fourier coefficients.

5. The method of claim 3, wherein said lower frequencies comprise a lowest 33% of said frequency range of said Fourier coefficients.

6. The method of claim 1, further comprising quantizing said Fourier coefficients to a selected number of bits, wherein said selected number of bits is based on a frequency associated with said Fourier coefficient.

7. The method of claim 1, wherein said x-dimension comprises a range of 400 to 600 samples and said y-dimension comprises a range of 600 to 1000 samples.

8. The method of claim 1, wherein the length of said window comprises a range of 16-128 samples.

9. The method of claim 1, further comprising transmitting said compressed spectral image over a bandwidth limited communications link.

10. The method of claim 1, further comprising:
    performing wavelet decompression on said compressed spectral image along said x-dimension and along said y-dimension; and
    performing an inverse Fourier Transform on said wavelet decompressed data to generate a decompressed spectral image.

11. A system for generating a compressed spectral image, said system comprising:
    an image compression module configured to receive spectral image data, said spectral image data comprising a plurality of spectral intensity values, each of said spectral intensity values associated with a first spatial dimension (x-dimension), a second spatial dimension (y-dimension) and a wavelength dimension (λ-dimension);
    a windowing module configured to apply a window to said spectral image data along said λ-dimension, said window configured to select a subset of said spectral image data corresponding to a range of wavelengths;
    a Fourier transform module configured to perform a Fourier transform on said windowed spectral image data along said λ-dimension, said Fourier transform performed at a plurality of locations along said x-dimension and said y-dimension to generate a plurality of Fourier coefficients associated with each of said locations;
    a filter module configured to filter said Fourier transformed data to retain: a zero-frequency Fourier coefficient magnitude to encode spectral intensity at each of said locations, a low frequency subset of Fourier coefficient phases to encode Doppler shift at each of said locations, and a low frequency subset of Fourier coefficient magnitudes to encode spectral line widths at each of said locations; and a wavelet compression module configured to perform wavelet compression of said filtered data along said x-dimension and along said y-dimension to generate said compressed spectral image.

12. The system of claim 11, wherein a compression ratio is selected for said wavelet compression, said compression ratio associated with said Fourier coefficient.

13. The system of claim 11, wherein said Fourier coefficients are associated with a frequency range and said retained subset of Fourier coefficients comprise Fourier coefficients associated with lower frequencies of said frequency range.

14. The system of claim 13, wherein said lower frequencies comprise a lowest 15% of said frequency range of said Fourier coefficients.

15. The system of claim 13, wherein said lower frequencies comprise a lowest 33% of said frequency range of said Fourier coefficients.

16. The system of claim 11, wherein said filter module is further configured to quantize said Fourier coefficients to a selected number of bits, wherein said selected number of bits is based on a frequency associated with said Fourier coefficient.

17. The system of claim 11, wherein said x-dimension comprises a range of 400 to 600 samples and said y-dimension comprises a range of 600 to 1000 samples.

18. The system of claim 11, wherein the length of said window comprises a range of 16-128 samples.

19. The system of claim 11, further comprising a transmission module configured to transmit said compressed spectral image over a bandwidth limited communications link.

20. The system of claim 11, further comprising an image decompression module configured to perform wavelet decompression on said compressed spectral image along said x-dimension and along said y-dimension and further configured to perform an inverse Fourier Transform on said wavelet decompressed data to generate a decompressed spectral image.

21. An article comprising a non-transitory storage medium having stored thereon instructions that when executed by a machine result in the following operations:

receiving spectral image data, said spectral image data comprising a plurality of spectral intensity values, each of said spectral intensity values associated with a first spatial dimension (x-dimension), a second spatial dimension (y-dimension) and a wavelength dimension ($\lambda$-dimension);

applying a window to said spectral image data along said $\lambda$-dimension, said window configured to select a subset of said spectral image data corresponding to a range of wavelengths;

performing a Fourier transform on said windowed spectral image data along said $\lambda$-dimension, said Fourier transform performed at a plurality of locations along said x-dimension and said y-dimension, said Fourier transform configured to generate a plurality of Fourier coefficients associated with each of said locations;

filtering said Fourier transformed data to retain: a zero-frequency Fourier coefficient magnitude to encode spectral intensity at each of said locations, a low frequency subset of Fourier coefficient phases to encode Doppler shift at each of said locations, and a low frequency subset of Fourier coefficient magnitudes to encode spectral line widths at each of said locations; and performing wavelet compression of said filtered data along said x-dimension and along said y-dimension to generate said compressed spectral image.

22. The article of claim 21, wherein a compression ratio is selected for said wavelet compression, said compression ratio associated with said Fourier coefficient.

23. The article of claim 21, wherein said Fourier coefficients are associated with a frequency range and said retained subset of Fourier coefficients comprise Fourier coefficients associated with lower frequencies of said frequency range.

24. The article of claim 23, wherein said lower frequencies comprise a lowest 15% of said frequency range of said Fourier coefficients.

25. The article of claim 23, wherein said lower frequencies comprise a lowest 33% of said frequency range of said Fourier coefficients.

26. The article of claim 21, further comprising the operation of quantizing said Fourier coefficients to a selected number of bits, wherein said selected number of bits is based on a frequency associated with said Fourier coefficient.

27. The article of claim 21, wherein said x-dimension comprises a range of 400 to 600 samples and said y-dimension comprises a range of 600 to 1000 samples.

28. The article of claim 21, wherein the length of said window comprises a range of 16-128 samples.

29. The article of claim 21, further comprising the operation of transmitting said compressed spectral image over a bandwidth limited communications link.

30. The article of claim 21, further comprising the operations of:

performing wavelet decompression on said compressed spectral image along said x-dimension and along said y-dimension; and performing an inverse Fourier Transform on said wavelet decompressed data to generate a decompressed spectral image.

* * * * *